United States Patent Office 3,836,678
Patented Sept. 17, 1974

3,836,678
SAUSAGE ANALOG
Harold T. Leidy, New City, N.Y., Charles M. Kerrigan, Wayne, N.J., and Duane C. Byble, Ossining, N.Y., assignors to General Foods Corporation, White Plains, N.Y.
No Drawing. Continuation of abandoned application Ser. No. 35,267, May 6, 1970. This application Dec. 4, 1972, Ser. No. 312,174
Int. Cl. A23j 3/00
U.S. Cl. 426—350
2 Claims

ABSTRACT OF THE DISCLOSURE

A sausage-like food product is prepared by autoclaving a gel precursor which is a mixture of non-fibrous gelable soy protein isolate and a material selected from albumen, casein, whey and mixtures thereof.

This is a continuation of application Ser. No. 35,267 filed May 6, 1970, and now abandoned.

BACKGROUND OF THE INVENTION

The present invention is directed to the formation of materials containing a high percentage of vegetable protein. The vegetable protein is processed so that products simulating meat in essential characteristics are made. The edible material of the present invention is formulated to resemble well known sausage-type products which would incorporate an emulsion-like meat composition.

In recent years, a great deal of effort has been made in the field of protein technology in producing meat substitutes. Development has been undertaken with inexpensive non-meat sources of protein, particularly vegetable proteinaceous ingredient. Extensive deviations in technique and formulation are necessary depending upon the type of meat product to be duplicated.

Boyer, U.S. Pat. No. 2,682,466, patented June 29, 1954, teaches the formation of synthetic meat products employing quantities of vegetable protein filaments. These protein filaments are made by forcing a colloidal protein dispersion through a porous membrane, such as a spinnerette into a coagulating bath. The dispersion is precipitated into the form of filaments. The filaments are assembled into a meat-like product by employing binding materials, including cereals and protein. The product may resemble filet mignon, turkey and chicken.

Anson and Pader, holders of numerous U.S. patents, including U.S. Pat. Nos. 2,802,737; 2,813,024; 2,813,025; 2,830,902 and 2,833,651; patented in either 1957 or 1958, teaches formation of protein containing products resembling meat. These patentees teach formation of a "chewy protein gel," wherein various techniques to form various meat-like products are taught. The chewy protein gel is formed by adjusting a gel precursor such as soy or peanut concentrates to a pH of above 6.0, followed by heating to convert to the chewy protein gel. Various additives including protein filaments, doughs, flavoring ingredients, etc., may be incorporated in the synthetic meat products.

Kjelson, U.S. Pat. No. 3,343,963, patented Sept. 26, 1967, teaches formation of high protein food products resembling chopped ground meats. A source of spun edible protein fibers is bound together with a binder consisting of albumen, gluten and particulate oilseed material. The composition is heat set to form the simulated meat product.

More recently, Hartman, U.S. Pat. No. 3,320,070, patented May 16, 1967, has taught formation of bacon-like products from man-made fibers of natural vegetable protein with a binder including albumen and an edible proteinate. The bacon-like product is formulated with lean and nonlean portions so that the real meat product is resembled.

The present invention is considered to be a further development in the field of proteinaceous materials resembling meat products. This invention is considered a significant advance in sausage-type items wherein essential characteristics, including texture, chewiness and taste of the meat counterpart is duplicated.

SUMMARY OF THE INVENTION

The present invention teaches the formation of sausage-like products which are formulated and processed to resemble sausage meat compositions. In the prior art, sausage foods are made by forming a meat containing emulsion, shaping to physical shape and heat curing to stable physical form. The food of this invention, a sausage-type product, employs a gel containing system that resembles its sausage counterpart in physical and taste characteristics. Foods such as bologna, olive loaf, hot dogs, sausage meats in general would be essenentially duplicated.

In the manufacture of these sausage-type products, a vegetable source dispersion of protein is a required ingredient. In addition to the vegetable protein, an additional protein source, namely, albumen, casein or whey may be utilized. The protein source dispersion is formed into a gel system by application of heat. This gel system from the protein material is considered to be a critical aspect of this invention. The gel formed is considered permanent, that is, in normal food use, including refrigeration and warming to eating temperature, the formed product will retain its shape.

In one aspect of the invention, a vegetable source of protein is formed into a gel system by employing a desirable pH with a heat setting condition. With a vegetable protein system, a pH below 6.0 may be utilized prior to gelation. This pH is preferred since a product resembling its meat counterpart is obtained. Additionally, with the vegetable protein, specific heating conditions aid in formation of a gel resembling meat. Optimum heating temperatures are above about 212° F. Preferably, elevated pressure such as by autoclaving accompanies heating although other heating techniques including microwave and deep fat frying will provide the gelation conditions.

In a further aspect of the invention, it has been found that an additional source protein that gels namely, albumen, casein, whey or combinations in conjunction with the vegetable protein, greatly aids in formulating the sausage-type product. The sources of protein, namely, vegetable protein and the added component form a gel which is considered a significant advance in the technology of meat-like products.

In the fabrication of the protein gel, it has been found that the gel system of the vegetable protein and added gel precursor should be homogenous. In other words, the vegetable protein with albumen, casein and/or whey work in conjunction with one another, rather than as completely separate, distinct components in forming the gel composition.

An advantage of the gel system employed in the present invention is that various sausage-type products may be made from essentially the same formulation. As an example, bologna-type items and hot dog-type foods can be produced with exactly the same starting ingredients.

The product of the present invention is formulated in a particular area of protein technology resembling meat. For example, the present product avoids the use of excess fibers mixed with a gel system. Highly fibrous products, such as steaks, pork chops and the like would not be duplicated by employing only the disclosed gel system. As employed herein, a steak-type material refers to all highly chewy fibrous products wherein a system of fibers bound together is used. Thus, these steak-type meat products would differ from processed meat emulsions.

While fibrous materials may be included in the gel system in small amounts, these materials are considered to be an additive, rather than an integral system in contrast to food products whose physical form and chewiness qualities are obtained by the use of a great amount of the fibrous components. The physical shape of the system of the present invention is obtained by the gel wherein, of course, added components are employed to complete flavor and textural qualities. In other words, a meat product is duplicated which requires processing meat containing protein into an emulsion system.

Various added ingredients may be blended into the vegetable gel system preferably before heat setting. Illustrative of the wide field of selection of additives include fat, flavoring ingredients, starches, emulsifiers, coloring materials, gums, as well as other proteinaceous sources; e.g. gelatin. Additionally, flavor components such as by smoking may be introduced into the protein system.

DETAILED DESCRIPTION OF THE INVENTION

First, it is necessary to define what is meant by sausage-type or sausage-like products. This terminology is directed to food products which resemble meat products that require processing into an emulsion system, shaping and heating to solidify to a stable physical form. The proteinaceous vegetable-containing gel precursor, together with additive duplicate in function a meat emulsion. It is the purpose of the gel system of the present invention in the sausage-like products to essentially entrap additives that are added. A sausage-type product contrasts directly to a steak-type item that may be considered a system of fibers with a binding ingredient. Sausage-type products would not resemble natural meat cuts such as steak, pork chops, or pot roast-type items. Furthermore, processed meat items lie outside the scope of this use of sausage-type meat wherein merely the physical character of the natural meat item is changed. Products resembling hamburger, ground ham and ground beef are not considered sausage-like products, since essentially only chopping or grinding of the initial meat component takes place.

On the other hand, to employ positive language, the sausage-like products of the present invention are formulated to resemble meat products having initial emulsion characteristics. A meat emulsion in the prior art is heated, which results in some water loss and gelling so that a degree of rigidity is introduced. A conventional meat containing sausage is first formed into an emulsion system by added components including water. This meat emulsion system has flow characteristics so that it may be formed into a desired shape. In most instances, the emulsion is stuffed into a casing, although any containing component may be employed. After heating under desired conditions to set the shape, the casing or encompassing container may be removed. Examples of such processed meat products include, bologna, olive loaf, hot dogs, etc. In the present invention, it is this type of meat product which is duplicated and similarities in the initial formulation and process steps exists. The present proteinaceous containing material is made into a gel precursor which is the counterpart of the meat emulsion and is shaped followed by a heat treatment to set the gel. Process equipment from the meat industry may be employed directly in the manufacture of sausage analogs.

It is the intent of the sausage-type products of the present invention that the protein gel constituent dominate a significant portion of the product mass with added constituents merely enhancing the formed product. In the formation of the gel system which may include additional fillers and components in resembling an emulsion, it is required that a significant amount of the gel precursor material be of the disclosed protein. More specifically, the protein should be from a vegetable source as for example, soy, due to its high protein content and inexpensiveness. However, many other types of vegetable sources may be used including peanuts, cottonseed, peas, etc. The source of vegetable protein should be concentrated and preferably bland, i.e. in the case of soy, unwanted flavors and oils should be removed. These protein sources are readily available in commercial form such as isolates, concentrates and flours.

The vegetable proteinaceous material, as employed herein, has the quality that, upon heating, in a carrier such as water, gelation occurs to a stable physical form, i.e. rigidity is introduced. However, as in typical gel systems, elasticity is present. Ordinarily, the protein content, based on concentrated proteinaceous vegetable material will be above about 30% by weight of solids (i.e. dry basis). There is no upper limit on the maximum protein content. Concentrations of protein above 95% are satisfactory and desirable.

A liquid carrier preferably water, is necessary to cause gelation of a proteinaceous dispersion. As employed herein, a proteinaceous dispersion refers to the proteinaceous material being present in the liquid carrier, either in solution and/or a suspension.

The gel precursor from the vegetable protein is preferably adjusted to a pH range that is near a meat product before the heat setting operation. Highly basic or acid ranges are not suitable from taste consideration and gelling standpoints. Additional components such as flavorings, spices, color, fat may contribute to the pH control without resorting to separate addition of an acid or base. It has been found that a pH of the gel precursor below 6.0 such as a range of 5.0 to 5.8 is desirable. Higher pH, such as that pH range taught by the Anson and Pader Patents discussed above, may also be employed with beneficial results. The gel precursor is shaped into the desired form and heat set to form the gel. While elevated temperatures as for example from about 150° F. to about 350° F. may be used, it is considered that the optimum temperatures lie above the boiling point of water. The preferred technique of heat setting to form a gel is by an autoclaving operation employing elevated pressure, since relative short heat set times may be used. However, favorable results can be obtained by other heating techniques including microwave heating or deep fat frying.

While a source of vegetable protein has been found to yield a meat analog that is satisfactory in quality, superior results occur when at least one additional non-vegetable source of protein is used. These sources of proteins are albumen, casein, whey or combinations thereof, and yield a product that closely duplicates the quality and characteristics of sausage-type products as defined herein. The use of the added gel components with the concentrated vegetable protein is of utmost importance and a novel aspect of the invention.

In using component combinations for gelatin, it is required that the combination of these source constituents be essetially homogeneous for the gel component prior to the heat setting operation. While the vegetable component or added albumen, casein or whey may be heat set alone, the gel of the present disclosure of a sausage analog would not be obtained. With nonuniformity, the gel of the present invention would not be manufactured, but rather a product with separate heterogenous phases would be obtained.

Thus, it may be readily seen that a source of protein fibers, that are not heat set, would not be a suitable physical form for the gel. If only protein fibers such as from a vegetable protein were employed, a steak-type fiberous material would be produced as opposed to a sausage-like food. If source protein fibers were employed initially for the homogenous gel, the fibers would be comminuted and could no longer be considered to retain their initial physical identity.

The concentration by weight of gellable vegetable proteinaceous material to albumen, casein, whey and combinations thereof is considered critical for necessary qualities, if the final product is to resemble closely a sausage-type product. The degree of concentration of the vegetable material may vary, since the necessary criteria is that upon heating, gelation to a stable physical form will occur. Therefore, the desirable ratios of proteinaceous material to albumen, casein, whey, or combinations is set forth on the basis of the protein content of the vegetable material, rather than the total weight of the proteinaceous vegetable material.

The minimum concentrations of vegetable protein to albumen, casein, and whey should be of the order of about 3.4:1, 5:3 and 1:1 respectively. With combinations of albumen, casein and whey, the minimum concentration of vegetable protein is intended to encompass a weighted total of these added gel precursors.

The maximum vegetable protein concentration to these added gel components should be of the order of about 40 to 1.

From the above description, it may be seen that the ingredients to form the gel are critical in the sausage-type product of the present invention. The quality of the analog stands or falls with the gel components, since this component like its meat counterpart is a significant portion of the overall product. The added gel component in addition to the fibers in a steak-type product is necessary, but this latter gel serves a different primary function, namely, bonding the fibers into a chewy product. The overall texture effect, particularly in chewing in a steak, comes from the fibers with the gel serving their obvious binding function. The gel system is secondary in chewiness with the proper binding effect determining its make-up in a highly fibrous product. In contrast, in sausage-type products, the gel system is much more critical with different necessary properties, since its overall purpose is not primarily as a binder. Rather, the gel in the present invention is not chewy in the sense of a steak, but rather the sausage-type product contains a dominating gel system. For this reason criticality in the type of the gel employed is of paramount importance.

As employed herein, gel is employed in its normal definition, i.e., a solid or semi-solid system of protein in colloidal dimensions in a carrier liquid which is preferably water.

Similarly, in a sausage-type meat, the water content of the product is critical if the overall food product characteristics are to be duplicated. The water content, based on the total weight of the food, should be within the range of about 42% to 74%. An optimum range would be within 52–62%. However, obviously, sausage products which contain a meat emulsion differ greatly in water product, e.g. a dry sausage in comparison to a wetter sausage, and this fact helps determine the water content of the analog.

As set forth previously, various additives enhance the flavor, chewiness and textural qualities of the gel processed to be a meat analog. Fillers have been found to give textural qualities to the gel as for example, "bounce qualities" in biting in the case of a hot dog type item. A suitable filler may be produced in accordance with McAllister and Finucane Pat. No. 3,102,031, patented Aug. 27, 1963, which is directed to a "High Protein Food Granule." An additional example of a filler is an expanded protein produced by extrusion at elevated temperature and pressure wherein a sudden release of pressure is employed to expand the proteinaceous-containing material.

An additional component that is desirable in the meat analog is fat or oil which may be provided from any conventional source. If employed, the content of fat is below 35%, based on the total weight of the product. Additionally, to produce a high quality meat analog, flavorings, spices and coloring material are most desirable.

The following examples illustrate more fully the innovative aspects of the gel-type product synthesized to meat analogs.

Example 1

To form a product that resembles bologna, the following constituents were used:

| | Percent |
|---|---|
| Soy Protein Isolate (30% Solids) | 42.8 |
| Albumen | 1.0 |
| Wheat gluten/Soy grits/flour mixture (Expanded filler—30% solids) | 20.8 |
| Crisco Oil | 18.8 |
| Water | 13.9 |
| Seasoning/Flavor/Color | 2.7 |

The wheat gluten-soy grits-flour mixture is an expanded high source protein in form of particles and is used as a filler material. This expanded mixture is formed by mixing wheat gluten, soy grits and flour with water to make concentration of about 25%. The mix is fed into an inlet of a heated Model X–25 Wenger Extruder wherein the mix is subjected to elevated temperature and pressure by a revolving screw in the extruder. This mix is extruded through two 3/8" diameter dies with a recorded pressure of approximately 150 p.s.i.g. and a temperature of approximately 300° F. at the die face to form a wet expanded product. The expanded product is soaked in water and ground before added to the other constituents employed in this example.

The materials of this example are emulsified in a Hobart Cutter for a ten-minute period. Any large particles in the mix are further comminuted in a Puc Mill following the emulsification step. The emulsion is subjected to a seven-inch vacuum for one minute. The emulsion is stuffed in a casing employing conventional equipment used in formulation of bologna. The process is autoclaved at a pressure of 7 to 9 p.s.i.g. for 45 minutes. After storing overnight under refrigeration, the casing is removed yielding a bologna-type analog that closely mirrors its meat counterpart. The bologna-type meat product was analyzed for content:

| | Percent |
|---|---|
| Water | 56.9 |
| Protein (6.25×N) | 17.6 |
| Fat | 19.9 |
| Carbohydrate | 2.2 |
| Other | 3.4 |
| | 100.0 |

Example 2

The initial constituents of Example 1 were formulated in identical fashion through the emulsification step in the Hobart Silent Cutter for a ten-minute period. After this step, the emulsion was extruded, cased and linked. This product was heat set in an autoclaving operation for 10 minutes under a pressure of 7–9 p.s.i.g. The heat set product was smoked naturally for twenty minutes, followed by storage overnight under refrigeration. The casing was removed and a product in appearance and taste resembling a hot dog was produced. The final composition analysis was the same as the preceding examples.

Example 3

The technique of Example 1 was employed to produce another sausage-type product with the following initial constituents:

| | Percent |
|---|---|
| Soy Protein Isolate | 41.9 |
| Sodium Caseinate | 2.9 |
| Wheat gluten/soy grits/flour mixture (Expanded filler—30% solids) | 20.4 |
| Crisco Oil | 18.5 |
| Water | 13.6 |
| Seasoning/Flavor/Color | 2.7 |

The processing step including temperature and time of gelation were similar to Example 1 and yielded a highly satisfactory sausage-type product.

Example 4

The techniques of Examples 1 and 4 were employed with the following initial ingredients:

| | Percent |
|---|---|
| Soy Protein Isolate | 40.7 |
| Whey | 5.7 |
| Wheat gluten/soy grits/flour mixture (Expanded filler—30% solids) | 19.8 |
| Crisco Oil | 17.9 |
| Water | 13.2 |
| Seasoning/Flavor/Color | 2.7 |

The above examples are illustrative of the ingredients and process parameters in producing a sausage-type product of high protein content that closely resembles its meat counterpart. Obviously, many modifications in process parameters and conditions will be obvious to those skilled in the art and it is not intended that the above examples place limits upon the invention. Rather, all modifications are intended to be included in the scope of the invention as defined in the following claims:

What is claimed is:

1. A process for preparing a sausage-type food product containing gelled protein, 42 to 74% by weight water and fat in an amount below 35% by weight which simulates meat products prepared from meat emulsions comprising mixing non-fibrous gelable soy protein isolate and a material selected from the group consisting of albumen, casein, whey and mixtures thereof, with water to form a homogenous, flowable gel precursor mixture, said soy protein isolate being present above about 30% by weight, on a dry basis, of the precursor mixture and wherein the minimum weight ratio of said soy protein isolate to albumen, casein or whey is above a minimum ratio of 3.4:1, 5:3 or 1:1 respectively or a weighted total for mixtures thereof and wherein the maximum weight ratio of said soy protein to albumen, casein, whey or combinations thereof is about 40:1, said gel precursor having a pH below 6.0 prior to autoclaving, shaping the gel precursor to desired form and subsequently autoclaving the mixture at elevated pressure and a temperature above 212° F. to set the gel which resembles a sausage-type product.

2. The process of claim 1 wherein said pH is from about 5.0 to about 5.8.

References Cited
UNITED STATES PATENTS

| 2,560,621 | 7/1951 | Wrenshall | 99—14 |
| 3,108,873 | 10/1963 | Durst | 99—14 |
| 3,644,121 | 2/1972 | Boyer et al. | 99—17 |
| 3,662,673 | 5/1972 | Boyer et al. | 99—17 |

JAMES R. HOFFMAN, Primary Examiner

U.S. Cl. X.R.

426—104, 364